March 29, 1938. L. W. BURCH ET AL 2,112,393
TANK
Filed March 23, 1935 2 Sheets-Sheet 1
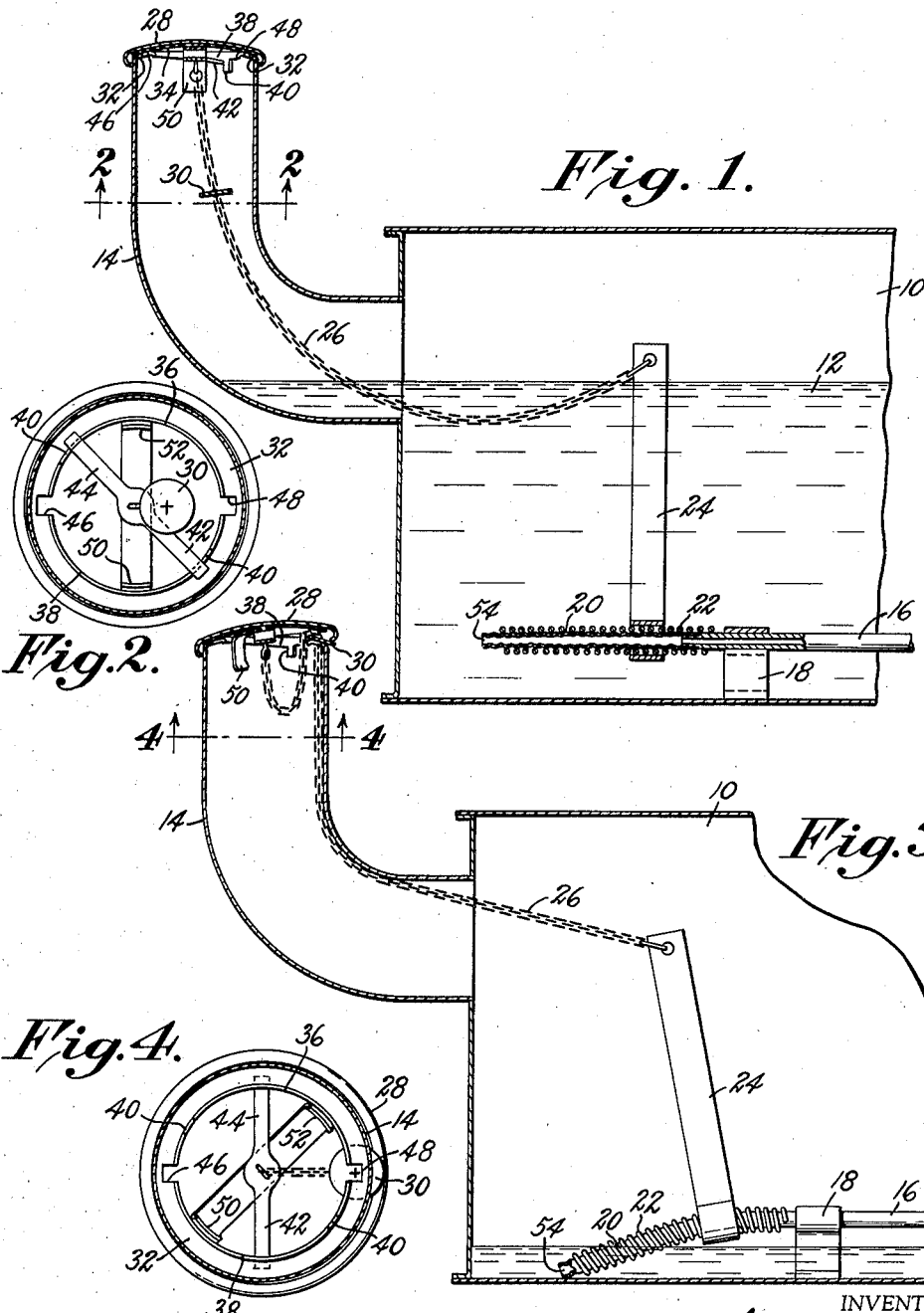
INVENTORS
Lyndon W. Burch
Malcolm K. Parkhurst
BY
Jarvis C. Marble
their ATTORNEY.

March 29, 1938. L. W. BURCH ET AL 2,112,393
TANK
Filed March 23, 1935 2 Sheets-Sheet 2
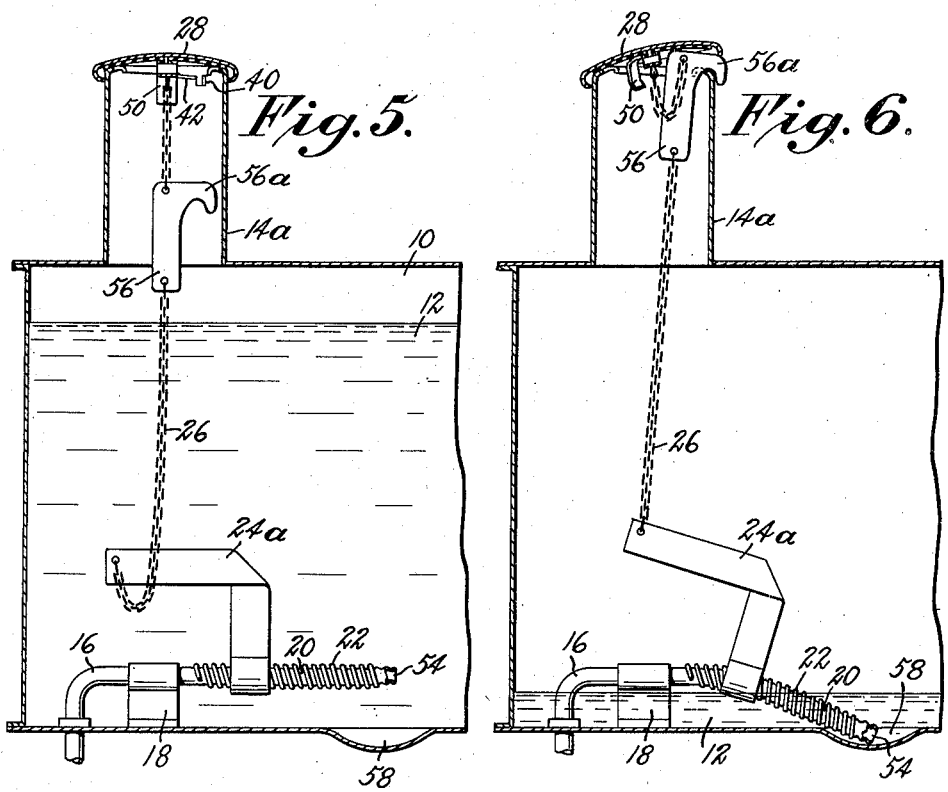
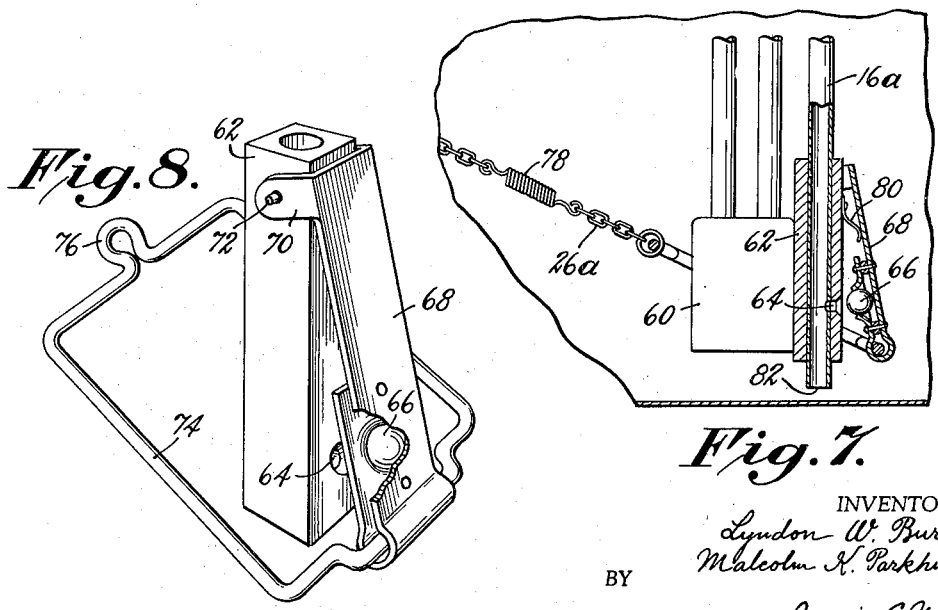
INVENTORS
Lyndon W. Burch
Malcolm K. Parkhurst
BY
Jarvis C. Marble
their ATTORNEY.

Patented Mar. 29, 1938

2,112,393

UNITED STATES PATENT OFFICE 2,112,393

TANK

Lyndon W. Burch, Bronxville, and Malcolm K. Parkhurst, Bronx, N. Y.

Application March 23, 1935, Serial No. 12,610

8 Claims. (Cl. 158—46.5)

The present invention relates to tanks and has particular reference to fuel tanks for automotive vehicles and the like.

The principal object of the invention is to provide a reserve feature for such tanks which is extremely simple and effective, very low in cost, reliable in operation, and which is of such a nature that when the reserve feature is employed the normal filling operation of the tank is interfered with, so that resetting of the apparatus to its normal operating condition for the tank can be reliably depended upon in the normal course of events.

We are aware that there have heretofore been advanced many different proposals for various kinds of apparatus providing reserve features for fuel tanks, but the forms of apparatus heretofore proposed have been subject to numerous objections of cost and complication, unreliability, and principally such devices have afforded no practical means whereby resetting of the tank to normal operating conditions is reliably insured. Briefly stated, it may be said that we have accomplished the general object of our invention by providing, in conjunction with the fuel pipe for taking fuel from the tank, means whereby the level of the effective inlet opening of the fuel pipe may be altered, such means being operative through the filling pipe for the tank, and when in a position such that the reserve supply of fuel in the tank is available, the cap for the filling pipe for the tank cannot be placed in normal closed position because of interference with a portion of the means whereby the reserve fuel supply is made available.

The invention may readily be embodied in many specifically different forms of apparatus, and for purposes of illustration we have shown in the accompanying drawings several practical embodiments of apparatus for carrying the invention into effect.

For a better understanding of the nature of the invention and the detailed objects thereof, reference may best be had to the following description of the several embodiments illustrated in the drawings, in which:

Fig. 1 is a vertical section of a portion of a tank in which is incorporated apparatus embodying the invention;

Fig. 2 is a section taken on the line 2—2 of Fig. 1;

Fig. 3 is a section similar to Fig. 1 but showing the apparatus in position making the reserve supply of fuel in the tank available;

Fig. 4 is a section taken on the line 4—4 of Fig. 3;

Fig. 5 is a section similar to Fig. 1, but showing another form of apparatus embodying the invention;

Fig. 6 is a similar section showing the apparatus of Fig. 5 in another position;

Fig. 7 is a section showing still another form of apparatus embodying the invention; and Fig. 8 is a perspective view on an enlarged scale of part of the apparatus shown in Fig. 7.

Referring now to Figs. 1 to 4 of the drawings, reference character 10 indicates a tank containing a supply of liquid fuel 12 and having a filling pipe or neck 14. Fuel is withdrawn from the tank through the fuel pipe 16, which may extend through the wall of the tank either at the bottom or the top thereof as may be desired. Adjacent to the inlet end of the pipe 16 a metal strap 18, which may advantageously be spot-welded to the tank, supports the pipe. The inlet end of pipe 16 is made flexible, and we have found an advantageous construction for the flexible end of the pipe to consist of a short length of bellows type tubing 20 of known form, which is used as the inner element of flexible tubing of the kind commercially known as "Triplex". The tubing 20 is advantageously fitted to the end of the copper or steel tube 16, and is further preferably surrounded by a coiled length of spring wire 22 one end of which is wrapped about the rigid end of the pipe 16, and which normally serves to hold the flexible pipe end in the position shown in Fig. 1. A metal strap 24 having its lower end bent around the coil 22 provides a lever to the upper end of which is attached a flexible tension member 26 which may be in the form of a chain, braided wire, or the like, and which extends through the filler pipe 14. The outer end of the member 26 is attached to the filler cap 28, and intermediate the ends of member 26 there is attached a retaining member in the form of a washer or the like 30.

In the embodiment illustrated I have shown a filler pipe and cap construction such as is ordinarily employed at present on automobile fuel tanks. In this form of construction the end of the wall of the filler pipe 14 is bent inwardly as at 32 to provided a seat for the cap gasket 34. Beyond the seat the pipe wall is further bent downwardly to form two lips 36 and 38 having stops at their ends, one of which is shown at 40 in Fig. 1. The lower edges of the lips 36 and 38 are inclined, and are adapted to be engaged by the arms 42 and 44 attached to the inner side of the cap to provide a bayonet joint or lock for the filler cap.

In the embodiment illustrated the inturned portion 32 of the filler pipe is shown as being provided with a substantial downward inclination outwardly toward the periphery of the pipe and the notches 46 and 48 through which the ends of the arms 42 and 44 are adapted to pass when the cap is placed in position, afford recesses into which the tension member 26 may be hooked, the slope of the portion 32 tending to make the washer or the like slide outwardly and remain in this position when the device is placed in this position.

In addition to the arms 42 and 44 forming a part of the bayonet joint, the inner side of the filler cap is preferably provided with a pair of spring metal arms having downwardly bent ends 50 and 52 and adapted to engage the inner downwardly bent lips 36 and 38.

The manner in which the apparatus operates will be largely evident from the drawings.

As shown in Fig. 1, the apparatus is in its normal operating position with the tension member 26 slack and the flexible end of the fuel pipe in horizontal position with the inlet 54 a predetermined distance above the bottom of the tank. Obviously, the supply of fuel to the pipe 16 will fail when the apparatus is in this position, while there is still a reserve of fuel in the bottom of the tank. The amount of the reserve will of course be determined by the height above the bottom of the tank of the inlet opening 54 when in its normal operating position. When the fuel supply fails, all that is necessary to do to make the reserve supply available is to remove the filler cap, pull on the tension member sufficiently to move the flexible fuel pipe inlet to the position shown in Fig. 3, with the inlet opening 54 at the bottom of the tank, and hook the retaining washer into one of the recesses 46 or 48 where it is retained in position by the spring tension provided by the coiled wire 22, which tends to return the apparatus to its normal position. As previously explained, the slope of the seat 32 acts to maintain the washer in position under the influence of tension of the member 26. The washer itself and the surplus length of the tension member above the washer effectively prevent replacement of the filler cap in its proper position, and consequently when the tank is again filled there is substantially no possibility of the operator forgetting to return the reserve apparatus to its proper position, insuring a reserve of fuel in the tank which will not be unknowingly exhausted because of retention of the apparatus in the position shown in Fig. 3.

Inasmuch as there is very little fuel in the tank whenever it is necessary for the apparatus to be placed in the position shown in Fig. 3, it is practical and in some ways highly desirable to have the apparatus arranged so that whenever the position shown in Fig. 3 is assumed, it is impossible to place the cap 28 in such a position that it will cover the end of the pipe 14. In other words, it may be desirable from the standpoint of insuring the return of the apparatus to normal position when the tank is refilled, to have the design such that whenever the apparatus is in emergency position the cap 28 must be left dangling from the loose end of the chain. This, however, is not practical in all instances, since in many cases now the end of the filler pipe and the filler cap are substantially flush with a portion of the automobile body or mud apron, and the loose cap, under such conditions, might injure the finish of the car. It is for this reason that we provide means such as the arms 52 and 50, which may act to hold the filler cap in a position away from an adjacent portion of an automobile body. Even with the cap supported in this way, however, the position of the cap is so obviously not normal or proper that the apparatus will be set to its proper position by even the most casual operator.

In Figs. 5 and 6 we have shown another form of apparatus in which a top filling pipe 14a is used. In this embodiment the construction of the inlet end of the fuel pipe is as previously described, the strap lever 24a is bent so that the inlet of the fuel pipe can be brought to the bottom of the tank by a straight upward pull of the tension member 26. Further, in this embodiment the tension member has interposed between its ends a retainer 56 which may advantageously be in the form of a metal stamping having a hook portion 56a at one side thereof adapted to hook over the edge of the end of the pipe 14a to bring the apparatus into reserve position and to prevent proper attachment of the filler cap while the apparatus is in this position.

In order to eliminate the possibility of breakage of the tension member 26 by too hard a pull, a coil spring may be interposed in this member; but we have found that practically this is not essential, since sufficient resilience is provided by the flexible end of the fuel pipe to permit the washer, hook or other retaining member to be pulled readily to a position where it can be hooked over the end of the filler pipe.

If it is desired to have the reserve apparatus make available the last bit of fuel in the tank, the bottom of the tank may be formed with a depression 58 into which the end of the fuel pipe can enter when the apparatus is placed in reserve position. The advantage of this, however, we believe is more than counterbalanced by the possibility of drawing dirt or other sediment into the fuel pipe, and would therefore prefer to have the end of the inlet pipe when in reserve position maintained a slight distance above the bottom of the tank.

In Figs. 7 and 8 we have shown another form of apparatus for applying the invention to an existing form of fuel supply device in which the fuel pipe 16a enters the tank from the top and is attached near the bottom of the tank to part of a hydrostatic gauge indicated generally at 60 for showing the level of fuel in the tank. For incorporating the invention in this type of apparatus, we provide a sleeve 62 adapted to be secured to the lower end of pipe 16a. Sleeve 62 may advantageously be attached by sweating, and is also advantageously firmly attached to the indicator element 60. Further, the sleeve 62 is preferably made of some relatively soft metal and the hole 64 is drilled in the wall of the sleeve and of the filler pipe 16a to provide a conical seat for a ball valve 66 loosely held by the edges of a belled opening in a stamped plate member 68, which at its upper end is provided with ears 70 pivoted about pins 72 projecting from sleeve 62. Advantageously the member 68 is a sheet metal stamping, and at its lower end receives the ends of a bent wire loop 74 having an eye 76, to which is secured one end of a chain tension member 26a, which advantageously is provided intermediate its ends with a coil spring 78. The tension member 26a is adapted to pass through the filling pipe of the tank, as in the embodiments previously described, and may have attached thereto any suitable means such as the washer 30 shown in Fig. 1 or the hook member shown in Fig. 5 for retaining the tension member in emergency or reserve position. The member 68 is normally held in the position shown in Fig. 7 by means of a spring finger 80, so that the effective inlet opening of the fuel pipe 16a is the opening 64. When it is desired to make available the reserve supply of fuel in the tank, the cap is removed and the member 68 is pulled into a position in which the ball valve is seated to close the opening 64. This is done by pulling on the tension member and latching the retaining member in position on the neck of the filler pipe in the manner previously described. Obviously, the spring 78, if employed, is necessarily stronger than the spring finger 80. In this embodiment the spring 78 is required for a certain seating of the ball to be insured without placing undesirable lateral strain on the feed pipe when the apparatus is in emergency or reserve position. It will of course be evident that when the apparatus is in emergency or reserve position and the opening 64 is closed, the effective inlet of the fuel pipe 16a is the inlet 82 closely adjacent to the bottom of the tank.

As in previously described embodiments, when the tension member is released in order to return the filling cap to its proper closed position after the next filling of the tank, the spring finger 80 returns the pivoted member 68 to the position shown in Fig. 7 and the opening 64, which is the normal inlet opening, becomes the effective opening for the inlet pipe, below the level of which opening fuel cannot be withdrawn through the fuel pipe until the device is placed in the emergency or reserve position.

From the foregoing description it will be evident that many other changes in the specific design of the apparatus may be made without departing from the spirit or scope of the invention as defined in the appended claims.

What we claim is:

1. In a liquid container having a filling opening and a cap for sealing said opening, a pipe for withdrawing the contents of the container, said pipe having an effective inlet normally disposed a substantial distance above the bottom of the container to provide for a reserve supply of liquid in the container below said opening, and means operable through said filling opening to lower the level of the effective inlet of said pipe to an emergency position whereby to make available said reserve supply of liquid, said means including a retaining element effective when in operative position positively to prevent said cap from being placed in normal closed position to seal said filling opening.

2. In a fuel tank having a filling opening and a removable cap for sealing said opening, a fuel pipe for withdrawing fuel from the tank, said pipe having an effective inlet normally disposed a substantial distance above the bottom of the tank to provide for a reserve supply of fuel below the effective inlet opening and means operable through said filling opening to lower the level of the effective inlet of the fuel pipe, said means including a retaining element adapted to engage fixed wall structure adjacent said filling opening when in operative position and when in such position to prevent said cap from being returned to normal closed position sealing said opening.

3. In a fuel tank having a filling opening and a removable cap for sealing said opening, a fuel pipe having a resilient inlet end portion, said pipe being mounted with the inlet end thereof disposed a substantial distance above the bottom of the tank, and means including a tension member extending through said filling opening and having one of its ends attached to said cap for bending said resilient end of the fuel pipe to a position in which the inlet opening of the pipe is lower than its normal position and a retaining member associated with said tension member, said retaining member being adapted to engage wall structure adjacent said filling opening when in operative position to prevent said cap from being returned to normal closed position until said retaining member has been released and the inlet of the fuel pipe restored to normal position.

4. In a fuel tank having a filling pipe or neck providing a filling opening and a removable cap for sealing said opening, a fuel pipe having a resilient inlet end portion fixed in the tank so that the inlet end of the pipe is normally disposed a substantial distance above the bottom of the tank, a lever member attached to said resilient portion and arranged to bend said portion so as to move the inlet end of the pipe from its normal position toward the bottom of the tank, a tension member attached at one end to said lever and at the other end to said cap and passing through said filling opening, and a retaining member intermediate the ends of said tension member and adapted to be hooked over the edge of the filling opening when the tension member is pulled to lower the inlet of the fuel pipe from its normal position, said retaining member acting when in operative position to prevent the return of the cap to normal closed position.

5. In a fuel tank having a filling opening and a removable cap for sealing said opening, a fuel supply pipe having an effective inlet opening situated a substantial distance above the bottom of the tank, means for lowering the level of the effective inlet opening of the fuel pipe, said means being operable through the filling opening and including an element engaging the wall of the filling opening and projecting therefrom when in operative position to prevent the return of the filling cap to normal closed position in which the opening is sealed, and means associated with said cap and adapted to engage the walls of said opening for holding said cap in a position other than normal closed position.

6. In a fuel tank having a filling neck providing a filling opening and a removable cap for sealing said opening, a fuel supply pipe having a flexible inlet end portion, said inlet end portion including a coiled wire element adapted to resiliently maintain the inlet end of the pipe a predetermined distance above the bottom of the tank, a lever member attached to said flexible portion, a flexible tension member passing through said filling neck and attached at one of its ends to said lever and at the other of its ends to said cap, a retaining member attached to said tension member at a place spaced from the filler cap, said tension member being adapted to be partially withdrawn through said filling neck to lower the inlet end of said fuel pipe from its normal position, and said retaining member being adapted to be hooked over the edge of said filling opening to retain the inlet end of the fuel pipe in its lowered position, said retaining member when in operative position preventing the return of the filler cap to normal closed position in which said opening is sealed.

7. In a fuel tank having a filling opening and a cap having a normal closed position sealing said opening, a fuel pipe having an inlet end portion maintaining the inlet opening of the pipe at a normal level substantially above the bottom of the tank and displaceable to move said inlet opening to an emergency position at a lower level in the tank, and means operable through said filling opening for displacing said inlet portion to move said inlet opening to said emergency position, said means including a part adapted to engage fixed structure to maintain said inlet opening in emergency position and when in engaged position to prevent return of said cap to its normal closed position.

8. In a fuel tank having a filling opening and a cap having a normal closed position sealing said opening, a fuel pipe having an inlet end portion maintaining the inlet opening of the pipe at a normal level substantially above the bottom of the tank and displaceable to move said inlet opening to an emergency position at a lower level in the tank, and means operable through said filling opening for displacing said inlet portion to move said inlet opening to said emergency position, said means including a yieldable tension member and a retaining member associated with said tension member, said retaining member being adapted to engage structure adjacent to said filling opening and when in engaged position to prevent return of said cap to its normal closed position.

LYNDON W. BURCH.
MALCOLM K. PARKHURST.